United States Patent
Jang (10) Patent No.: US 8,902,223 B2
(45) Date of Patent: Dec. 2, 2014

(54) DEVICE AND METHOD FOR DISPLAYING A THREE-DIMENSIONAL IMAGE

(75) Inventor: Jun-yeoung Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/376,664

(22) PCT Filed: May 17, 2010

(86) PCT No.: PCT/KR2010/003089
§ 371 (c)(1),
(2), (4) Date: Dec. 7, 2011

(87) PCT Pub. No.: WO2010/143819
PCT Pub. Date: Dec. 16, 2010

(65) Prior Publication Data
US 2012/0075301 A1 Mar. 29, 2012

Related U.S. Application Data (60) Provisional application No. 61/184,850, filed on Jun. 8, 2009.

(51) Int. Cl.
*G06T 15/00* (2011.01)
*H04N 13/04* (2006.01)
*G09G 3/00* (2006.01)

(52) U.S. Cl.
CPC ....... *H04N 13/0438* (2013.01); *H04N 13/0497* (2013.01); *G09G 3/003* (2013.01)
USPC ........................................................ 345/419

(58) Field of Classification Search
CPC ............. G06T 15/00; H04N 13/0438–13/0497
USPC ........................................... 348/51; 345/419
See application file for complete search history.

(56) References Cited

U.S. PATENT DOCUMENTS 5,875,055 A 2/1999 Morishima et al.
6,509,983 B1 * 1/2003 Klug ............................... 359/35
(Continued)

FOREIGN PATENT DOCUMENTS

CN 100430778 C 11/2008
CN 101356832 1/2009
(Continued)

OTHER PUBLICATIONS

European Search Report dated Aug. 16, 2013 for corresponding Application No. 10786302.9.

(Continued)

*Primary Examiner* — Thai Tran
*Assistant Examiner* — Nien-Ru Yang
(74) *Attorney, Agent, or Firm* — Ked & Associates, LLP (57) ABSTRACT

The invention relates to a device for displaying a three-dimensional image, comprising: a display unit for alternately displaying a left image and a right image on an entire screen; a polarizing unit disposed on a front surface of the display unit, for changing a polarizing direction of incident light by a horizontal line unit; and a polarizing control unit for controlling the polarizing direction of a horizontal line of the polarizing unit to be synchronized with a refresh time of the horizontal line of the display unit corresponding to the horizontal line and changed. Accordingly, by changing the polarizing direction between a left image and a right image in synchronization with screen-refreshing, crosstalk can be minimized when displaying a three-dimensional image and a user satisfaction with three-dimensional images can be increased.

15 Claims, 7 Drawing Sheets

(56) References Cited

U.S. PATENT DOCUMENTS

| | | | |
|---|---|---|---|
| 6,523,006 B1 * | 2/2003 | Ellis et al. | 704/270 |
| 2002/0039230 A1 | 4/2002 | Lin | |
| 2007/0008406 A1 * | 1/2007 | Shestak et al. | 348/58 |
| 2007/0229951 A1 * | 10/2007 | Jung et al. | 359/465 |
| 2007/0274675 A1 * | 11/2007 | Park | 386/66 |
| 2008/0101421 A1 * | 5/2008 | Gordon et al. | 370/535 |
| 2008/0316303 A1 | 12/2008 | Chiu et al. | |
| 2009/0046214 A1 | 2/2009 | Park | |

FOREIGN PATENT DOCUMENTS

| | | |
|---|---|---|
| EP | 1 742 492 A2 | 1/2007 |
| JP | S63 203088 A | 8/1988 |
| JP | 2002 101427 A | 4/2002 |
| JP | 2003 202519 A | 7/2003 |
| KR | 10-2007-0095101 | 9/2007 |

OTHER PUBLICATIONS

International Search Report issued in PCT Application No. PCT/KR 2010/003089 dated Dec. 28, 2010.

Chinese Office Action dated Dec. 19, 2013 for corresponding Application No. 201080034940.2.

* cited by examiner

DEVICE AND METHOD FOR DISPLAYING A THREE-DIMENSIONAL IMAGE

This application is a U.S National Stage Application under 35 U.S.C. §371 of PCT Application No. PCT/KR2010/003089, filed May 17, 2010, which claims priority to U.S. Provisional Application Ser. No. 61/184,850, filed Jun. 8, 2009.

TECHNICAL FIELD

The present disclosure relates to a device and method for displaying an image, and more particularly, a device and method for displaying a three-dimensional image.

BACKGROUND ART

In general, a stereoscopic three-dimensional (3D) display device according to the related art provides a user with 3D images enabling depth perception and stereovision.

DISCLOSURE OF THE INVENTION

Therefore, an aspect of the detailed description is to provide a device and method for displaying a three-dimensional (3D) image capable of minimizing crosstalk between a left image and right image in an active retarded mode.

To achieve these and other advantages and in accordance with the purpose of the present invention, as embodied and broadly described herein, there is provided a device for displaying a three-dimensional image including a display unit to alternately display a left image and a right image on an entire screen, a polarizing unit disposed on a front surface of the display unit to change a polarizing direction of incident light by a horizontal line unit, and a polarizing control unit to control the polarizing direction of a horizontal line of the polarizing unit to be synchronized with a refresh time of the horizontal line of the display unit corresponding to the horizontal line and changed.

The polarizing control unit may control the polarizing direction of the horizontal line of the polarizing unit to be changed in synchronization with a horizontal synchronizing signal for the horizontal line of the display unit.

The polarizing control unit may identify a horizontal line which is image-scanned or to be image-scanned based on a vertical synchronizing signal and a horizontal synchronizing signal for the display unit, and control the polarizing direction of the horizontal line of the polarizing unit corresponding to the identified horizontal line.

The polarizing control unit may determine a frame scan start time point from the vertical synchronizing signal for the display unit, determine a horizontal line scan time point with respect to each horizontal line from the horizontal synchronizing signal for the display unit, identify a horizontal line which is image-scanned or to be image-scanned, and control the polarizing direction of the horizontal line of the polarizing unit corresponding to the identified horizontal line to be changed.

The polarizing control unit may determine the number of horizontal synchronizing signals generated after generation of the vertical synchronizing signal for the display unit, and control a polarizing direction of a horizontal line of the polarizing unit with a turn corresponding to the determined number to be changed.

The polarizing control unit may control the polarizing direction of the horizontal line of the polarizing unit to be changed before generation of a horizontal synchronizing signal for a horizontal line succeeding a horizontal line of the display unit corresponding to the horizontal line.

The polarizing control unit may control the polarizing direction of the horizontal line of the polarizing unit to be changed in synchronization with a rising edge or a falling edge of a horizontal synchronizing signal for a horizontal line of the display unit corresponding to the horizontal line.

Each horizontal line of the polarizing unit may change a polarizing direction of incident light into a first or second polarizing direction, and the first and second polarizing directions may be different from each other.

The three-dimensional image display device may be a polarized glasses method.

In accordance with another exemplary embodiment, there is provided a device for displaying a three-dimensional image including an image signal splitter unit to split image data and a synchronizing signal from a three-dimensional image signal, a display panel to alternately display a left image and a right image formed by the image data on an entire screen based on the synchronizing signal, a polarizer disposed on a front surface of the display panel, and having a plurality of horizontal line polarizing modules for changing a polarizing direction of incident light, and a polarizing control unit to control a polarizing direction of the horizontal line polarizing module to be changed in synchronization with a refresh time of a corresponding horizontal line of the display unit.

The polarizing control unit may control the polarizing direction of the horizontal line of the polarizer to be changed in synchronization with a horizontal synchronizing signal for a horizontal line of the display panel corresponding to the horizontal line.

The polarizing control unit may identify a horizontal line which is image-scanned or to be image-scanned based on a vertical synchronizing signal and a horizontal synchronizing signal for the display panel, and control the polarizing direction of a horizontal line polarizing module of the polarizer corresponding to the identified horizontal line.

The polarizing control unit may determine a frame scan start time point from the vertical synchronizing signal for the display panel, determine a horizontal line scan time point with respect to each horizontal line from the horizontal synchronizing signal for the display panel, identify a horizontal line which is image-scanned or to be image-scanned, and control a polarizing direction of a horizontal line polarizing module of the polarizer corresponding to the identified horizontal line to be changed.

The polarizing control unit may control the polarizing direction of the horizontal line polarizing module of the polarizer to be changed before generation of a horizontal synchronizing signal for a horizontal line succeeding a horizontal line of the display unit corresponding to the horizontal line.

The three-dimensional image display device may further include a tuner to select a broadcast signal of one channel of a plurality of broadcast signals and output the selected broadcast signal, a demodulation and channel decoder to demodulate the broadcast signal from the tuner and perform an error-correction decoding for the demodulated signal, so as to output a transport stream, a transport demultiplexer to demultiplex the transport stream to split a video Packetized Elementary Stream (PES) and an audio PES, a packet release unit to release a packet for the video PES and the audio PES to restore a video Elementary Stream (ES) and an audio ES, an audio decoder to decode the audio ES to output an audio bit stream, a video decoder to decode the video ES to output a video bit stream, a speaker to output an analog audio signal corresponding to the audio bit stream, and a three-dimensional formatter to generate the three-dimensional audio signal from the video bit stream.

The polarizing control unit may control the polarizing direction of the horizontal line polarizing module to be changed into a user set direction.

To achieve these and other advantages and in accordance with the purpose of the present invention, as embodied and broadly described herein, there is provided a method for displaying a three-dimensional image in a three-dimensional image display device including a display panel to alternately display a left image and a right image on an entire screen, and a polarizer to change a polarizing direction of incident light, wherein the polarizing direction of the incident light may be changed by a horizontal line unit of the polarizer according to a horizontal synchronizing signal for the display panel.

The three-dimensional image display method may include identifying a horizontal line which is image-scanned or to be image-scanned based on a vertical synchronizing signal and the horizontal synchronizing signal for the display panel, and controlling a polarizing direction of a horizontal line of the polarizer corresponding to the identified horizontal line to be changed.

In the control step, the polarizing direction of the horizontal line of the polarizer may be controlled to be changed before generation of a horizontal synchronizing signal for a horizontal line succeeding a horizontal line of the display panel corresponding to the horizontal line.

The three-dimensional image display method may be a polarized glasses method.

ADVANTAGEOUS EFFECT

In accordance with the device and method for displaying the 3D image of the detailed description, by changing the polarizing direction between the left image and the right image in synchronization with screen-refreshing, crosstalk can be minimized when displaying the 3D image and user satisfaction with 3D images can be increased.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinafter, description will be given in detail of exemplary embodiments of a device and method for displaying a three-dimensional image, capable of minimizing crosstalk between a left image and a right image and increasing user satisfaction with 3D images in an active retarded mode, with reference to FIGS. 1 to 7.

First, ideas and terms required for explanation of the exemplary embodiments will be described.

Configuration of Stereoscopic Image

A stereoscopic image is composed of a left image (an image for a left eye) and a right image (an image for a right eye). Schemes for configuring a stereoscopic image includes a top-down scheme in which left and right images are disposed up and down within one frame, a Left-to-Right (L-to-R) (side by side) scheme in which left and right images are disposed within one frame in left and right directions, a checker board scheme in which segments of left and right images are disposed as tiles are aligned, an interlaced scheme in which left and right images are disposed alternately by a row unit or a column unit, a time sequential (or frame by frame) scheme in which left and right images are displayed alternately per time, and the like. Hence, one stereoscopic scene consists of two frames for the time sequential scheme, and one frame for non-time sequential scheme.

Active Retarded Method

An active retarded method is configured to display a left image and a right image on an entire screen in an alternate manner. The active retarded method may be understood as a 3D image display method, in which a polarizing direction of a polarizer attached onto a display panel is changed based on a screen-refreshing period such that a left image and a right image, which are input through polarizing filters mounted in polarized glasses that a user wears, can be input into a left eye and a right eye, respectively.

Figure 1:
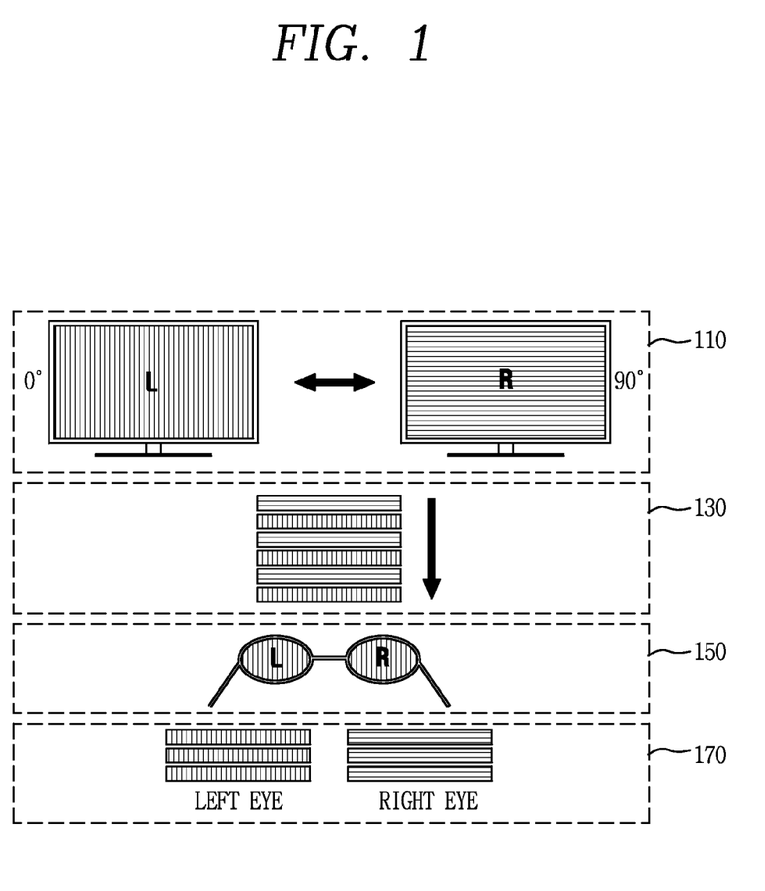
FIG. 1 is an overview of an operation in an active retarded method.

FIG. 1 is an overview showing an operation of the active retarded method.

In the active retarded method, the polarizing directions for a left image and a right image are different from each other. For example, based on a predetermined direction, a polarizing direction for the left image may be set to −45° and a polarizing direction of the right image may be set to +45° or the polarizing direction for the left image may be set to 0° and the polarizing direction of the right image may be set to 90°. FIG. 1 shows an exemplary operation performed when the polarizing direction for the left image is set to 0° and the polarizing direction for the right image is set to 90° based on a horizontal direction.

Referring to FIG. 1, when a left image L and a right image R are displayed alternately on an entire screen of a display, polarizing directions of a polarizer are changed into 0° and 90° in an alternate manner in synchronization with the screen displaying (110). Accordingly, from the perspective of a user who views a 3D image, the left image and the right image having the different polarizing directions are consecutively displayed in the alternate manner (130). Polarizing filters mounted in polarized glasses of the user may filter and transmit the left image and the right image, respectively (150). In this exemplary embodiment, the left polarizing filter transmits only the left image whose polarizing direction is 0°, and the right polarizing filter transmits only the right image whose polarizing direction is 90°. Finally, a left eye receives only the left image and a right eye receives only the right image (170).

Hereinafter, a configuration of a 3D image display device will be described with reference to FIG. 2.

Figure 2:
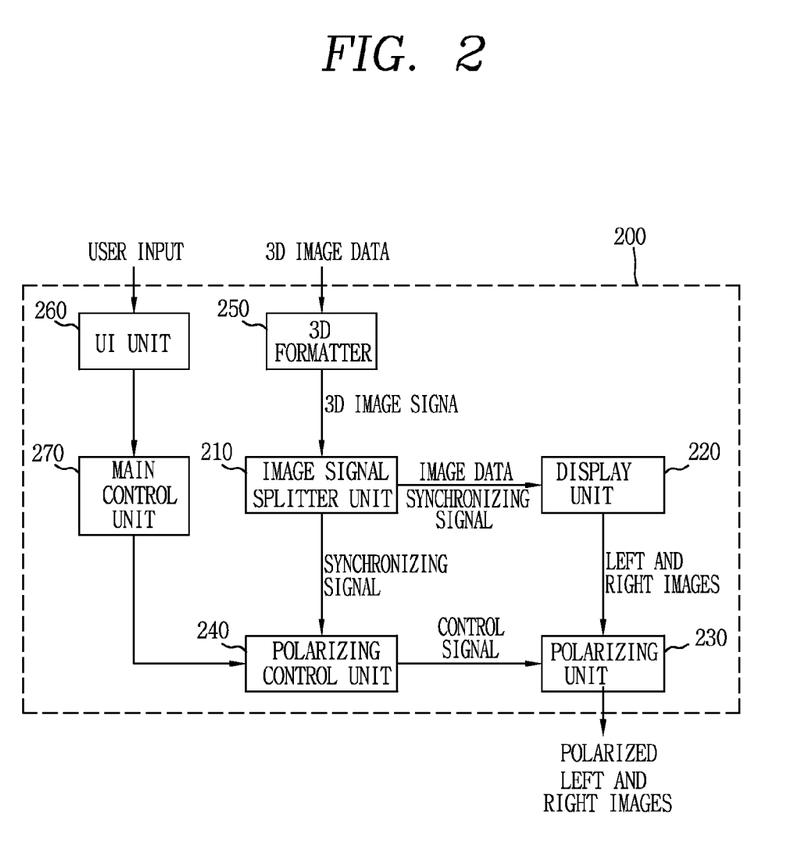
FIG. 2 is a block diagram showing a configuration of a display device, to which a three-dimensional (3D) image display device is applied, in accordance with one exemplary embodiment.

FIG. 2 is a block diagram showing a configuration of a display device, to which a 3D image display device is applied, in accordance with one exemplary embodiment.

A display device 200 in accordance with one exemplary embodiment may display 3D images corresponding to 3D image signals by a stereoscopic method, and be implemented in various types. Examples of the display device 200 may be a display panel, a computer monitor, a projection system and the like.

As shown in FIG. 2, the display device 200 may include an image signal splitter unit 210, a display unit 220, a polarizing unit 230, a polarizing control unit 240, a 3D formatter 250, a User Interface (UI) unit 260, a main control unit 270 and the like. Those components of the display device 200 shown in FIG. 2 are not all essential components. The display device 200 may be implemented alternatively by greater or fewer components.

The image signal splitter unit 210 may split image data and a synchronizing signal from a 3D image signal. In the active retarded method, the left image and the right image are formed as separate frames, so the 3D image signal may be a left image signal or a right image signal at a particular time point.

The image data indicates information relating to brightness, saturation and color of each pixel configuring a screen, and may be configured in an appropriate image format, such as RGB, CMYK, YCbCr (a color space used as a part of a color image pipeline in a video and digital photo system), YIQ (a color space in an NTSC color television system), HIS (Hue, Saturation and Lightness), etc. The synchronizing signal is reference information or control information for normal displaying of a target image based on the image data, and prevent the target image from being fluctuated or broken on a screen. The synchronizing signal may be a Vertical Synchronizing signal (VSYNC), a Horizontal Synchronizing signal (HSYNC), a pixel clock, a dot clock, and the like.

In the meantime, the display device 200 may further include a 3D formatter 250. The 3D formatter 250 may convert 3D image data formed in one 3D input image format into a 3D image signal in a specific format that the display unit 220 is able to display. For example, when an input image is formed by a top-down scheme and the display unit 220 displays a 3D image by a time sequential scheme, the 3D formatter 250 appropriately converts one image frame in the top-down manner into an image signal with respect to left and right image frames in the time sequential manner. The image signal splitter unit 210 may then split image data and a synchronizing signal from the 3D image signal, which is converted and provided by the 3D formatter 250.

Here, the 3D formatter 250 and the image signal splitter unit 210 may be implemented as one block or one device having a function of outputting each signal configuring a 3D image signal in a distinguishing manner. For example, the display device 200 in accordance with the one exemplary embodiment may not separately include the image signal splitter unit 210, but allow the 3D formatter 250 to perform the function of the image signal splitter unit 210. Here, the 3D formatter 250 may split a 3D image signal generated from 3D input image into image data and a synchronizing signal and output them.

The display unit 220 may include a panel, and a panel driving circuit to convert left and right image signals into a format suitable to be displayed on the panel and generate control signals, such as various types of timing control signals, driving signals and the like.

The display unit 220 may include a liquid crystal display, a plasma display panel, a thin film transistor-liquid crystal display, an organic light emitting diode, a field emission display, a flexible display or the like.

Also, two or more display units 220 may be employed according to the configuration of the display device 200. For example, the display device 200 may simultaneously include an upper display unit (not shown) and a lower display unit (not shown).

Meanwhile, the display unit 220 may sequentially scan image data on a screen in synchronization with a synchronizing signal. In detail, the display unit 220 may scan an image of one frame formed based on the image data sequentially from top to bottom or bottom to top of a screen. While an image of a previous frame is still displayed on a lower portion of the screen of the display unit 220, an image of the next frame may be scanned on an upper portion of the screen, and accordingly, a part of a left image frame and a part of a right image frame may be displayed on one screen.

Especially, the display unit 220 may alternately display a left image and a right image formed based on image data on an entire screen according to a synchronizing signal. That is, the display unit 220 may display a 3D image according to a time sequential method.

The polarizing unit 230 may transmit only light in a specific polarizing direction among light incident from the display unit 220 such that light transmitted through the polarizing unit 230 can all have only the same polarizing direction. The polarizing unit 230 may include a polarizer or at least one polarization film of an iodine-based polarization film, a dye-based polarization film, a phase polarization film, a semi-transparent polarization film, a high-reflective semitransparent polarization film, an anti-glare/anti-reflection film, a reflective polarization film and a Liquid Crystal (LC) film.

The polarizing unit 230 may change (convert) a polarizing direction into a specific direction according to an electric control signal. For example, the polarizing unit 230 may change a polarizing direction alternately into −45° and +45° or into 0° and 90°, based on a predetermined direction. As described with reference to FIG. 1, when the polarizing unit 230 changes the polarizing direction alternately into 0° and 90°, light having a polarizing direction of 0° and light having a polarizing direction of 90°, with respect to incident light, may be alternately transmitted.

Especially, the polarizing unit 230 may be disposed on a front surface of the display unit 220 to change a polarizing direction of incident light by a horizontal line unit. To this end, the polarizing unit 230 may include a plurality of horizontal line polarizing modules in a vertical direction. The horizontal line polarizing modules may be driven independent of one another, and change a polarizing direction of incident light into a first or second polarizing direction different from each other or into a random polarizing direction.

The polarizing control unit 240 may control the polarizing direction of the polarizing unit 230 according to a synchronizing signal. The polarizing control unit 240 may independently control the respective polarizing directions of the plurality of horizontal line polarizing modules included in the polarizing unit 230. The polarizing control unit 240 may also control the polarizing directions of the horizontal line polarizing modules to be changed in synchronization with a refresh time of horizontal lines of the display unit 220 corresponding to the corresponding horizontal line polarizing modules, respectively.

Particularly, the polarizing control unit 240 may receive a horizontal synchronizing signal with respect to each horizontal line of the display unit 220 from the image signal splitter unit 210, and control the polarizing direction of each horizontal line polarizing module of the polarizing unit 230 corresponding to each horizontal line of the display unit 220 to be changed in synchronization with the horizontal synchronizing signal.

Alternatively, the polarizing control unit 240 may receive a vertical synchronizing signal and a horizontal synchronizing signal with respect to the display unit 220 from the image signal splitter unit 210, identify a horizontal line which is image-scanned or to be image-scanned based on the vertical synchronizing signal and the horizontal synchronizing signal, and thereafter control a polarizing direction of a horizontal line polarizing module of the polarizing unit 230 corresponding to the identified horizontal line to be changed. This will be described in more detail as follows.

The vertical synchronizing signal is a reference signal used for refreshing of one screen or one frame. The polarizing control unit 240 may determine a frame scan start time point from the vertical synchronizing signal. Also, the horizontal synchronizing signal is a reference signal used for refreshing of one horizontal line. The polarizing control unit 240 may determine a scan time point for each horizontal line from the horizontal synchronizing signal. Therefore, the polarizing control unit 240 may identify a specific horizontal line which is currently image-scanned or is to be image-scanned, based on a frame scan start time point, a horizontal line scan time point, a horizontal synchronizing signal generation period and the like. That is, by using information relating to a specific period at which the horizontal synchronizing signal is generated and a frame scan start time point, the polarizing control unit 240 may predict a time point when a specific horizontal synchronizing signal is to be generated. This means that the polarizing control unit 240 can prepare beforehand a control command for a horizontal line polarizing module of the polarizing unit 240 corresponding to a horizontal synchronizing signal to be generated later as well as a horizontal line polarizing module of the polarizing unit 230 corresponding to a currently generated horizontal synchronizing signal. The polarizing control unit 240 may control a polarizing direction of a horizontal line polarizing module of the polarizing unit 230 corresponding to the identified horizontal line to be changed.

Alternatively, the polarizing control unit 240 may count the number of horizontal synchronizing signals generated after generation of a vertical synchronizing signal for one frame, and then identify specific horizontal lines corresponding to the number within one frame. In turn, the polarizing control unit 240 may control polarizing directions of horizontal line polarizing modules of the polarizing unit 230 corresponding to the identified horizontal lines.

The UI unit 260 may provide the main control unit 270 to be explained later with various types of manipulation commands or information input by a user. The UI unit 260 may include a receiving portion to receive an infrared signal or radio frequency (RF) signal sent from a remote controller, a keypad disposed on a front surface or a side surface of the display device 200, a receiving portion to receive a radio signal sent from a pointing device, which moves a pointer on a screen and supports an operation of selecting a position where the pointer is located.

The main control unit 270 may control an overall operation of the display device 200. The main control unit 270 may generate a control signal for control of an operation of the display device 200 in response to a user input signal input via the UI unit 260.

Meanwhile, after the UI unit 260 transfers a user input value with respect to a polarizing direction to the main control unit 270, when the main control unit 270 sends a polarizing direction reset control command to the polarizing control unit 240, the polarizing control unit 240 may control the polarizing direction of the polarizing unit 230 to be changed into a direction according to the user input value. For example, when the polarizing directions are set to 0° and 90° as default values in the display device 200, the user may input polarizing directions of −45° and +45° through a keypad manipulation.

Accordingly, the polarizing control unit 240 may control a polarizing direction of the horizontal line polarizing module of the polarizing unit 230 to be changed into −45° and +45° according to the user input value. Although not shown in FIG. 2, the UI unit 260 may transfer the user input value for the polarizing direction directly to the polarizing control unit 240, and the operation of the polarizing control unit 240 performed accordingly is understood by the aforementioned. The display device 200 can minutely adjust the polarizing direction of the polarizing unit 230 according to the user input value, which allows the user to view a 3D image with adapting to error or deviation of the polarizing directions of polarizing filters disposed in the polarized glasses.

At least two components of the 3D formatter 250, the image signal splitter unit 210, the polarizing control unit 240 and the main control unit 270 may be implemented as one block or one device. For example, the polarizing control unit 240 and the main control unit 270 may be implemented as one microprocessor, which has a function of controlling the operation of the display device 200 and the polarizing direction of the polarizing unit 230 in response to a user input signal.

The functions of the components employed in the display device 200 may be implemented in a computer-readable medium using software, hardware or combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein. For software implementation, the embodiments such as procedures and functions may be implemented together with separate software modules each of which performs at least one of functions and operations. The software codes can be implemented with a software application written in any suitable programming language. Also, the software codes may be stored in a memory (not shown) and executed by a processor (not shown).

Hereinafter, description will be given of an operation of changing a polarizing direction of the polarizing unit 230 in synchronization with an image scan time or a horizontal synchronizing signal of the display unit 220 in the display device 200 according to the exemplary embodiment, with reference to FIGS. 3 and 4.

Figure 3:
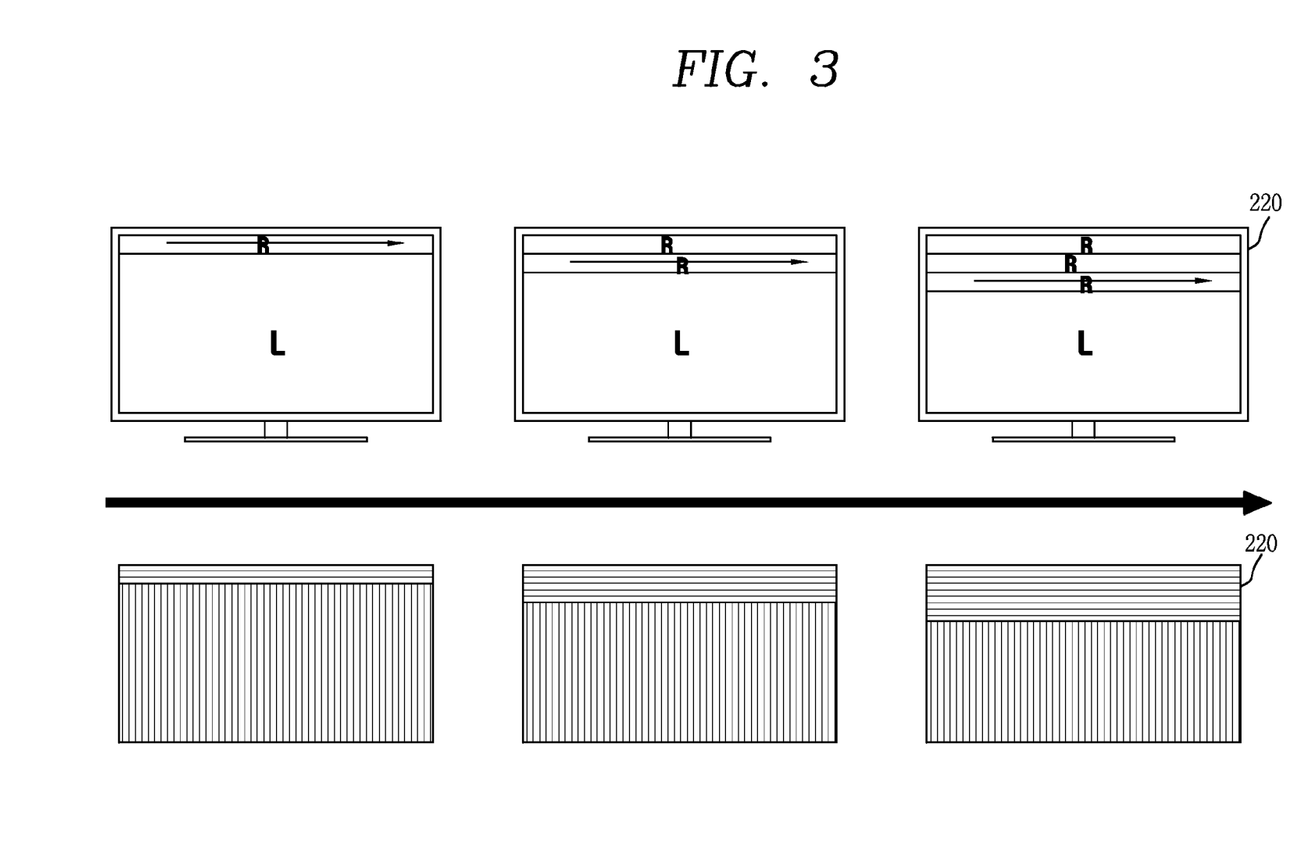
FIGS. 3 and 4 are exemplary views showing an operation of the display device, to which the 3D image display device is applied, in accordance with the one exemplary embodiment.
Figure 4:
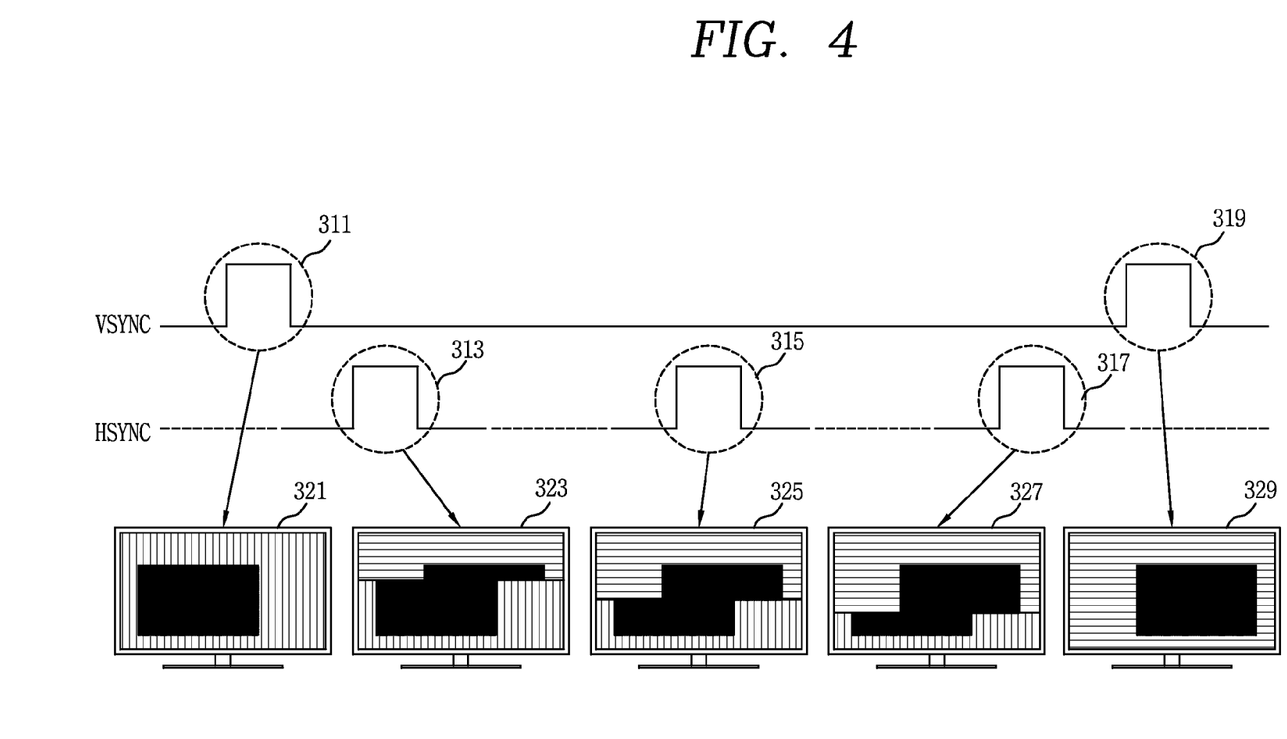

FIGS. 3 and 4 are exemplary views showing an operation of the display device, to which the 3D image display device is applied, in accordance with the one exemplary embodiment.

As shown in FIG. 3, after completing scanning of a left image on an entire screen, the display unit 220 scans a right image sequentially from top to bottom of the screen. Here, the polarizing unit 230 changes a polarizing direction sequentially from top to bottom of the screen by a horizontal line unit. FIG. 3 shows an example that a polarizing direction of 0° is changed into a polarizing direction of 90° in a sequential manner based on a horizontal line.

Although not shown in FIG. 3, as aforementioned, the polarizing control unit 240 may control the polarizing direction of the horizontal line polarizing module of the polarizing unit 230 to be changed in synchronization with the image scan time or the horizontal synchronizing signal for the horizontal line of the display unit 220 corresponding to the horizontal line polarizing module. For example, when the display unit 220 has a horizontal resolution of 1,080 lines and the polarizing unit 230 has 1,080 horizontal line polarizing modules in one-to-one correspondence with the horizontal lines of the display unit 220, the polarizing control unit 240 may control the polarizing directions of the $1^{st}$, $2^{nd}$, $3^{rd}$, . . . , and the $1,080^{th}$ horizontal line polarizing modules of the polarizing unit 230 to be changed in synchronization with the image scan time or horizontal synchronizing signal of the $1^{st}$, $2^{nd}$, $3^{rd}$, . . . , and the $1,080^{th}$ horizontal lines of the display unit 220.

Referring to FIG. 4, the operation of the display device 200 according to the one exemplary embodiment will be understood more clearly. FIG. 4 shows an example of changing the polarizing direction of the left image into 0° based on the horizontal line and the polarizing direction of the right image into 90° based on the horizontal line.

The lower part of FIG. 4 shows a process of scanning the left image and thereafter scanning the right image with a time difference from the left image, with respect to the same rectangle. From a time point 321 when the scanning for the left image is completed to a time point 329 when the scanning for the right image is completed, during intermediate time points 323, 325 and 327 for which the right image is being scanned, a rectangle as a part of the left image and a rectangle as a part of the right image are present on one screen.

The upper part of FIG. 4 shows vertical synchronizing signals 311 and 319 and horizontal synchronizing signals 313, 315 and 317. A frame synchronization that image scanning is synchronized by one screen frame unit is performed according to the vertical synchronizing signals 311 and 319, and a horizontal line synchronization that scanning for each horizontal line consisting of a frame is synchronized is performed according to the horizontal synchronizing signals 313, 315 and 317. Here, upon changing polarizing directions of the polarizing unit by the horizontal line unit in synchronization with the horizontal synchronizing signals 313, 315 and 317, even when the part of the left image and the part of the right image are present on the same screen, incident light can be changed into appropriate polarizing directions (323, 325 and 327).

Unlike FIG. 4, if the polarizing direction at the time point 321 when the scanning for the left image is completed is maintained as it is at the intermediate time points 323, 325 and 327, the rectangle as the part of the right image, which is displayed on the screen during the intermediate time points 323, 325 and 327, is input into a left eye, thereby causing interference that a 3D image is not correctly recognized.

Hereinafter, description will be given of a timing that the polarizing control unit 230 changes the polarizing direction of the polarizing unit 220 in the display device 200 according to the one exemplary embodiment, with reference to FIG. 5.

Figure 5:
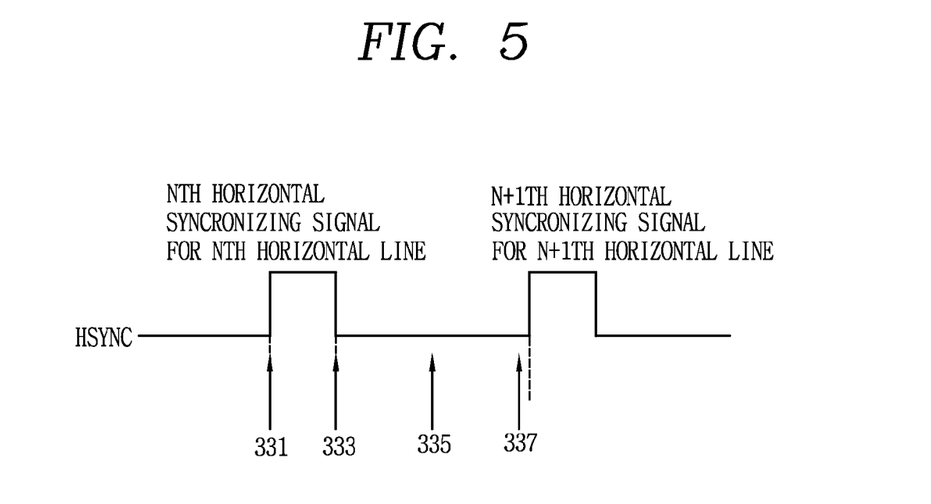
FIG. 5 is a timing diagram showing a method for changing a polarizing direction in the display device, to which the 3D image display device is applied, in accordance with the one exemplary embodiment.

FIG. 5 is a timing diagram showing a method for changing a polarizing direction in the display device, to which the 3D image display device is applied, in accordance with the one exemplary embodiment.

FIG. 5 shows an example of having a $n^{th}$ horizontal synchronizing signal for an $n^{th}$ horizontal line of the display unit 220 and a $n+1^{th}$ horizontal synchronizing signal for an $n+1^{th}$ horizontal line are present, and time points 331, 333, 335 and 337 when the polarizing control unit 240 changes polarizing directions of the polarizing unit 230 according to those signals.

For example, the polarizing control unit 240 may control a polarizing direction of the $n^{th}$ horizontal line polarizing module of the polarizing unit 230 to be changed in synchronization with a rising edge 331 or a falling edge 333 of a horizontal synchronizing signal for the $n^{th}$ horizontal line of the display unit 220.

Alternatively, the polarizing control unit 240 may control a polarizing direction of the $n^{th}$ horizontal line polarizing module of the polarizing unit 230 to be changed at a particular time point 335 between a generation time point of the horizontal synchronizing signal for the $n^{th}$ horizontal line of the display unit 200 and a generation time point of the horizontal synchronizing signal for the $n+1^{th}$ horizontal line.

Or, the polarizing control unit 240 may control the polarizing direction of the $n^{th}$ horizontal line polarizing module of the polarizing unit 230 to be changed at a time point immediately before generation of the horizontal synchronizing signal for the $n+1^{th}$ horizontal line of the display unit 220 (namely, a time point 337 right before generation of a rising edge with respect to the $n+1^{th}$ horizontal line). The time point 337 may be defined to mean a specific time point of the latter half (namely, after an intermediate time point) among time intervals from the generation time point of the horizontal synchronizing signal for the $n^{th}$ horizontal line to the generation time point of the horizontal synchronizing signal for the $n+1^{th}$ horizontal line.

In particular, the polarizing control unit 240 may determine a time point immediately before generation of the horizontal synchronizing signal for the $n+1^{th}$ horizontal line from a periodical characteristic of the horizontal synchronizing signal. When the polarizing control unit 240 controls a polarizing direction to be changed at the time point 337 immediately before the generation of the horizontal synchronizing signal for the $n+1^{th}$ horizontal line, it may change the polarizing direction after completion of refreshing (image scanning) for the $n^{th}$ horizontal line, thereby providing a 3D image with more improved quality.

Figure 6:
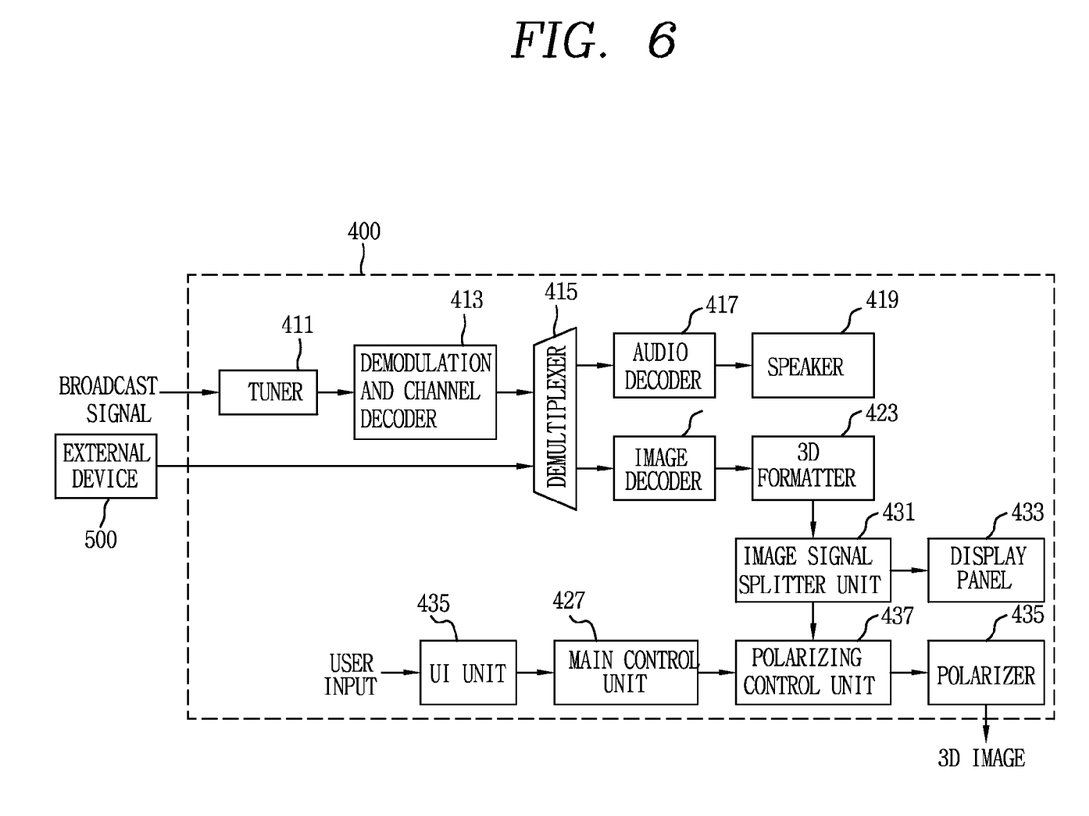
FIG. 6 is a block diagram showing a configuration of a television receiver, to which the 3D image display device is applied, in accordance with another exemplary embodiment.

FIG. 6 is a block diagram showing a configuration of a television receiver, to which the 3D image display device is applied, in accordance with another exemplary embodiment.

A television receiver 400 in accordance with one exemplary embodiment may display 3D images corresponding to 3D broadcast signals or 3D image data by a stereoscopic method, and be implemented in various forms. The television receiver 400 may receive a 3D broadcast signal through a wired or wireless network, such as a terrestrial network, a cable network, an Internet network, a mobile communication network, a satellite communication network or the like, or receive 3D contents data from an external device 500 such as a 3D Blue-ray disc player or the like, and thereafter display 3D image corresponding to the received 3D broadcast signal or 3D contents data by the stereoscopic method and output an audio signal.

Referring to FIG. 6, the television receiver 400 may include a tuner 411, a demodulation and channel decoder 413, a transport demultiplexer 415, an audio decoder 417, a speaker 419, an image decoder 421, a 3D formatter 423, a UI unit 425, a main control unit 427, an image signal splitter unit 431, a display panel 433, a polarizer 435, a polarizing control unit 437 and the like. Those components of the television receiver 400 shown in FIG. 2 are not all essential components. The television receiver 400 may be implemented alternatively by greater or fewer components.

The tuner 411 may select a broadcast signal of one channel from a plurality of broadcast signals and output the selected signal.

The demodulation and channel decoder 413 may demodulate the broadcast signal from the tuner 411 and perform an error-correction decoding for the demodulated signal so as to output a Transport Stream (TS). The demodulation and channel decoder 413 may include an Analog-Digital Converter (ADC) for output of the TS.

The transport demultiplexer 415 may demultiplex the TS provided from the demodulation and channel decoder 413 or the external device 500 so as to split a video Packetized Elementary Stream (PES) and an audio PES. Additionally, the transport demultiplexer 415 may extract information related to Program specific Information (PSI)/Program and System Information Protocol (PSIP). A packet release unit (not shown) may release a packet for the video PES and the audio PES to restore a video Elementary Stream (ES) and an audio ES. A PSI/PSIP processor (not shown) may receive the PSI/PSIP information from the transport demultiplexer 415, and parse the PSI/PSIP information to store in a memory or resistor. Accordingly, a broadcast signal decoding and a broadcast reproduction may be achieved based on the stored information.

The audio decoder 417 may output an audio bit stream by decoding the audio ES. The audio bit stream may be converted into an analog audio signal by a digital-analog converter (not shown), amplified by an amplifier (not shown), and output via the speaker 419.

The image decoder 421 may decode the video ES to restore a video bit stream.

The 3D formatter 423 may decode the video bit stream so as to output left and right image signals (especially, image data and synchronizing signal) for implementation of a stereoscopic 3D image.

The UI unit 425, the main control unit 427, the image signal splitter unit 431, the display panel 433, the polarizer 435 and the polarizing control unit 437 will be understood by the description given with reference to FIGS. 1 to 5 with respect to the UI unit 260, the main control unit 270, the image signal splitter unit 210, the display unit 220, the polarizing unit 230 and the polarizing control unit 240 of the display device 200, to which the 3D image display device is applied, according to the one exemplary embodiment, so description thereof will be omitted.

Meanwhile, a 3D image display method according to this specification relates to a method, in which a polarizer changes a polarizing direction of incident light by a horizontal line unit according to a horizontal synchronizing signal with respect to a display panel, in a 3D image display device including the display panel to alternately display a left image and a right image on an entire screen, and the polarizer to change the polarizing direction of the incident light.

In detail, according to the 3D image display method, a left image and a right image forming a stereoscopic image are alternately displayed on an entire screen. Polarizing directions of incident light are changed by a horizontal line unit in synchronization with horizontal synchronizing signals that the left image and the right image are scanned. Consequently, the left image and the right image are input into a left eye lens and a right eye lens of polarized glasses that a user wears, respectively.

Hereinafter, the 3D image display method will be described with reference to FIG. 7.

Figure 7:
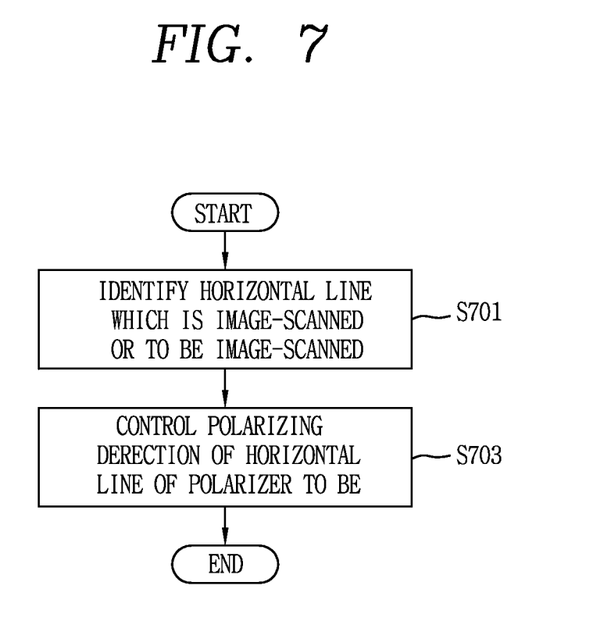
FIG. 7 is a flowchart showing a method for displaying a 3D image in accordance with one exemplary embodiment.

FIG. 7 is a flowchart showing a method for displaying a 3D image in accordance with one exemplary embodiment. Those components of the 3D image display method shown in FIG. 7 are not all essential components. The 3D image display method may be implemented alternatively by greater or fewer components.

Referring to FIG. 7, first, a horizontal line which is image-scanned or to be image-scanned is identified based on a vertical synchronizing signal and a horizontal synchronizing signal for a display panel (S701). A polarizing direction of a horizontal line of the polarizer corresponding to the identified horizontal line is controlled to be changed (S703). Especially, in the control step (S703), the polarizing direction of the horizontal line of the polarizer may be controlled to be changed immediately before generation of a horizontal synchronizing signal for the next horizontal line of a horizontal line of the display panel corresponding to the horizontal line.

The 3D image display method according to this specification may be understood similar to the description given with reference to FIGS. 1 to 6, in relation to the display device 200 and the television 400, to which the 3D image display device is applied, according to the one exemplary embodiment, description thereof will be omitted.

The invention claimed is:

1. A device for displaying a three-dimensional image, comprising:
    a display unit to alternately display a left image and a right image on an entire screen;
    a polarizing unit disposed on a front surface of the display unit to change a polarizing direction of incident light by a horizontal line unit, the polarizing unit including a plurality of horizontal line polarizing modules for changing the polarizing direction of incident light; and
    a polarizing control unit to control the polarizing direction of a horizontal line of the polarizing unit to be synchronized with a refresh time of the horizontal line of the display unit corresponding to the horizontal line and changed,
    wherein the polarizing control unit is configured to:
        receive a vertical synchronizing signal and a horizontal synchronizing signal with respect to the display unit;
        determine a frame scan start time point from the vertical synchronizing signal;
        determine a horizontal line scan time point with respect to each horizontal line from the horizontal synchronizing signal;
        identify a horizontal line which is image-scanned or to be image-scanned based on the determined frame scan start time point and the determined horizontal line scan time point;
        predict a time point when a specific horizontal synchronizing signal is to be changed using information related to a specific period at which the horizontal synchronizing signal is generated and the frame scan start time point; and
        control the polarizing direction of the horizontal line polarizing modules of the polarizing unit corresponding to the identified horizontal line to be changed at the predicted time point.

2. The device of claim 1, wherein the polarizing control unit controls the polarizing direction of the horizontal line of the polarizing unit to be changed in synchronization with a horizontal synchronizing signal for the horizontal line of the display unit.

3. The device of claim 1, wherein the polarizing control unit determines the number of horizontal synchronizing signals generated after generation of the vertical synchronizing signal for the display unit, and controls a polarizing direction of a horizontal line of the polarizing unit with a turn corresponding to the determined number to be changed.

4. The device of claim 1, wherein the polarizing control unit controls the polarizing direction of the horizontal line of the polarizing unit to be changed before generation of a horizontal synchronizing signal for a horizontal line succeeding a horizontal line of the display unit corresponding to the horizontal line.

5. The device of claim 1, wherein the polarizing control unit controls the polarizing direction of the horizontal line of the polarizing unit to be changed in synchronization with a rising edge or a falling edge of a horizontal synchronizing signal for a horizontal line of the display unit corresponding to the horizontal line.

6. The device of claim 1, wherein each horizontal line of the polarizing unit changes a polarizing direction of incident light into a first or second polarizing direction, the first and second polarizing directions being different from each other.

7. The device of claim 1, wherein the three-dimensional image display device employs a polarized glasses method.

8. A device for displaying a three-dimensional image comprising:
    an image signal splitter unit to split image data and a synchronizing signal from a three-dimensional image signal;
    a display panel to alternately display a left image and a right image formed by the image data on an entire screen based on the synchronizing signal;
    a polarizer disposed on a front surface of the display panel, and having a plurality of horizontal line polarizing modules for changing a polarizing direction of incident light; and
    a polarizing control unit to control a polarizing direction of the horizontal line polarizing module to be changed in synchronization with a refresh time of a corresponding horizontal line of the display unit,
    wherein the polarizing control unit is configured to:
        receive a vertical synchronizing signal and a horizontal synchronizing signal with respect to the display panel;
        determine a frame scan start time point from the vertical synchronizing signal;
        determine a horizontal line scan time point with respect to each horizontal line from the horizontal synchronizing signal;
        identify a horizontal line which is image-scanned or to be image-scanned based on the determined frame scan start time point and the determined horizontal line scan time point;
        predict a time point when a specific horizontal synchronizing signal is to be changed using information related to a specific period at which the horizontal synchronizing signal is generated and the frame scan start time point; and
        control the polarizing direction of the horizontal line polarizing modules of the polarizer corresponding to the identified horizontal line to be changed at the predicted time point.

9. The device of claim 8, wherein the polarizing control unit controls the polarizing direction of the horizontal line of the polarizer to be changed in synchronization with a horizontal synchronizing signal for a horizontal line of the display panel corresponding to the horizontal line.

10. The device of claim 8, wherein the polarizing control unit controls the polarizing direction of the horizontal line polarizing module of the polarizer to be changed before generation of a horizontal synchronizing signal for a horizontal line succeeding a horizontal line of the display unit corresponding to the horizontal line.

11. The device of claim 8, further comprising:
    a tuner to select a broadcast signal of one channel of a plurality of broadcast signals and output the selected broadcast signal;
    a demodulation and channel decoder to demodulate the broadcast signal from the tuner and perform an error-correction decoding for the demodulated signal, so as to output a transport stream;
    a transport demultiplexer to demultiplex the transport stream to split a video Packetized Elementary Stream (PES) and an audio PES;
    a packet release unit to release a packet for the video PES and the audio PES to restore a video Elementary Stream (ES) and an audio ES;
    an audio decoder to decode the audio ES to output an audio bit stream;
    a video decoder to decode the video ES to output a video bit stream;
    a speaker to output an analog audio signal corresponding to the audio bit stream; and
    a three-dimensional formatter to generate the three-dimensional audio signal from the video bit stream.

12. The device of claim 8, wherein the polarizing control unit controls the polarizing direction of the horizontal line polarizing module to be changed into a user set direction.

13. A method for displaying a three-dimensional image in a three-dimensional image display device comprising a display panel to alternately display a left image and a tight image on an entire screen, and a polarizer to change a polarizing direction of incident light, wherein the polarizing direction of the incident light is changed by a horizontal line unit of the polarizer according to a horizontal synchronizing signal for the display panel, wherein the three-dimensional image display device:
    receives a vertical synchronizing signal and a horizontal synchronizing signal with respect to the display panel;
    determines a frame scan start time point from the vertical synchronizing signal;
    determines a horizontal line scan time point with respect to each horizontal line from the horizontal synchronizing signal;
    identifies a horizontal line which is image-scanned or to be image-scanned based on the determined frame scan start time point and the determined horizontal line scan time point;
    predicts a time point when a specific horizontal synchronizing signal is to be changed using information related to a specific period at which the horizontal synchronizing signal is generated and the frame scan start time point; and
    controls the polarizing direction of the horizontal line polarizing modules of the polarizer corresponding to the identified horizontal line to be changed at the predicted time point.

14. The method of claim 13, wherein in the control step, the polarizing direction of the horizontal line of the polarizer is controlled to be changed before generation of a horizontal synchronizing signal for a horizontal line succeeding a horizontal line of the display panel corresponding to the horizontal line.

15. The method of claim 13, wherein the three-dimensional image display method employs a polarized glasses method.

* * * * *